United States Patent
Weimer et al.

(10) Patent No.: US 6,778,899 B2
(45) Date of Patent: Aug. 17, 2004

(54) PROCESS AND CONTROL UNIT FOR DETERMINING THE CRANKSHAFT ANGLE OF AN ENGINE AND DRIVE TRAIN

(75) Inventors: Jürgen Weimer, Euerbach (DE); Markus Kramer, Stadelschwarzach (DE)

(73) Assignee: Mannesmann Sachs AG, Schweinfurt (DE)

( * ) Notice: Subject to any disclaimer, the term of this patent is extended or adjusted under 35 U.S.C. 154(b) by 227 days.

(21) Appl. No.: 10/010,210

(22) Filed: Dec. 6, 2001

(65) Prior Publication Data

US 2002/0077740 A1 Jun. 20, 2002

(30) Foreign Application Priority Data

Dec. 16, 2000 (DE) .......................................... 100 62 985

(51) Int. Cl.[7] .............................................. G06F 19/00
(52) U.S. Cl. ................... 701/115; 73/118.1; 123/179.2; 123/406.18; 123/406.58
(58) Field of Search ......................... 123/179.3, 179.2, 123/179.25, 179.28, 406.18, 406.58, 406.62; 701/115; 73/118.1

(56) References Cited

U.S. PATENT DOCUMENTS

| | | | |
|---|---|---|---|
| 5,323,743 A | | 6/1994 | Kristiansson |
| 5,382,890 A | | 1/1995 | Moh et al. .................. 318/254 |
| 5,458,098 A | * | 10/1995 | Yagi et al. ................ 123/179.3 |
| 5,680,843 A | * | 10/1997 | Bacon et al. .......... 123/406.62 |
| 6,039,028 A | * | 3/2000 | Stuntz et al. ................ 123/436 |
| 6,085,723 A | * | 7/2000 | Pels et al. ............... 123/339.22 |
| 6,158,405 A | * | 12/2000 | Masberg et al. ......... 123/192.1 |
| 6,271,648 B1 | * | 8/2001 | Miller ......................... 320/150 |
| 6,324,488 B1 | * | 11/2001 | Siegl .......................... 702/151 |
| 6,453,863 B1 | * | 9/2002 | Pels et al. ................. 123/179.3 |
| 6,490,914 B1 | | 12/2002 | Brandenburg et al. |

FOREIGN PATENT DOCUMENTS

| | | |
|---|---|---|
| DE | 198 17 497 | 10/1999 |
| EP | 0 554 900 | 8/1993 |
| EP | 1 128 063 | 8/2001 |

* cited by examiner

Primary Examiner—Willis R. Wolfe
Assistant Examiner—Johnny H. Hoang
(74) Attorney, Agent, or Firm—Cohen, Pontani, Lieberman & Pavane

(57) ABSTRACT

In an engine having a crankshaft and a camshaft, the current angular position of a rotor fixed to the crankshaft is detected, and a top dead center (TDC) position of the crankshaft is determined based on the current angular position of the rotor, wherein the TDC position is one of an ignition top dead center (ITDC) and a gas transfer top dead center (GTDC). This determination may be made using a learning routine the first time the engine is started. The camshaft angle is then determined based on the TDC value and the current rotor position, and transmitted to a control unit for the engine. The current angular position of the rotor and the camshaft angle are stored in a memory unit when the engine stops, for use the next time the engine is started.

12 Claims, 1 Drawing Sheet

PROCESS AND CONTROL UNIT FOR DETERMINING THE CRANKSHAFT ANGLE OF AN ENGINE AND DRIVE TRAIN

BACKGROUND OF THE INVENTION

1. Field of the Invention

The present invention pertains to a process for determining the crankshaft angle in an engine having a crankshaft which is nonrototably connected to the rotor of an electric machine, to a control unit for determining the crankshaft angle of the engine, to a memory unit, to a computer program product, and to a drive train.

2. Description of the Related Art

Many different types of engines are known. For example, engines are used in vehicles, where they are usually designed as internal combustion engines. An electric machine, for example, can be connected to the engine. This electric machine can be a rotating machine, which, with the help of a magnetic field, converts electrical energy into mechanical energy when operating according to the motor principle or mechanical energy into electrical energy when operating according to the generator principle. An electric machine of this type can therefore function as a so-called starter-generator. A starter-generator is, for example, a permanent-magnet, synchronous machine, which can be installed between the crankshaft of the engine and the following components of the drive train. The starter-generator makes it possible to start the engine. In addition, it can also function as a generator during the operation of the vehicle and can therefore replace both the starter and the generator in the vehicle. Depending on the operating state of the electric machine, it is therefore possible for motor torque and/or generator torque to be produced.

Rotating fields occur in the electric machine. If the rotor rotates at the same speed as the rotating field of the stator, we call the machine a synchronous machine. If the rotor rotates more slowly or faster than the rotating field of the stator, we call the machine an asynchronous machine.

These types of electric machines usually have a device for determining the angular position of the rotor with respect to the stator. So that electric machines can be operated under optimum conditions, it is necessary for the angular position of the rotor to be known. One of the reasons for this is that electric machines usually require a static converter, so that they can obtain a three-phase feed from an intermediate circuit voltage. To generate the optimum torque it for the electric machine, the three-phase current must be impressed in such a way that the maximum torque can develop. For this purpose, the static converter must know the exact position of the rotor at all times. The ability to detect the position of the rotor with high precision is therefore the prerequisite for the operation of an electric machine at high efficiency.

When the engine is designed as an internal combustion engine for use in a motor vehicle, for example, the engine control unit must know the crankshaft angle and the camshaft angle when it starts the internal combustion engine. These values are important, because they are used, for example, to determine the ignition sequence, the ignition timing, and similar values. In the past, when an internal combustion engine is started, first the top dead centers (TDC) of the crankshaft and of the camshaft are detected as the crankshaft is rotated around an angle of 720°. This is also called the "learning phase". Only after the learning phase has been completed is it possible for the ignition of the internal combustion engine to start. So that the learning process can be accomplished in optimum fashion, the crankshaft must therefore first perform two complete revolutions, and from these two first crankshaft revolutions, the crankshaft position and the camshaft position, that is, the corresponding top dead centers, are then determined.

Solutions are also known for generating corresponding crankshaft signals and camshaft signals in discrete form. The scanning process according to the tooth/gap method could be mentioned here by way of example, which is carried out with so-called 60-2 toothed rings. This is a commonly used, well-known process.

The solutions known so far, however, suffer from a number of disadvantages. For example, long starting times are required, because two complete revolutions of the crankshaft must be completed first. This also means, however, that it is impossible for the engine to operate in any reasonable manner on a start-stop basis. Under conditions of start-stop operation, the internal combustion engine is turned off briefly when the vehicle comes to a stop, such as when stopping for a red light, and then is started again automatically when the vehicle is ready to start moving again.

In addition, very slow rotational speeds cannot be detected by the known solutions. This is especially true when the known tooth/gap scanning methods are used. In addition, the known solutions can be used reasonably only down to a certain lower rpm limit. Operation at very low rpm's of the internal combustion engine, such as in the range of an idling engine or in the situation that the engine has actually come to a complete stop, has not been possible so far.

SUMMARY OF THE INVENTION

The disadvantages described above in conjunction with the state of the art can be avoided. In addition, an improved control unit, an improved memory unit, an improved computer program product, and an improved drive train are also to be provided.

Features and details which are described in conjunction with the process according to the invention also apply to the control unit according to the invention and to the drive train according to the invention, and vice versa in each case. The same is also true for the memory unit according to the invention and the computer program product according to the invention.

According to the first aspect of the invention, the crankshaft angle of an engine is determined, where the engine is connected to an electric machine, functioning especially as a starter-generator, wherein the rotor of the electric machine is connected nonrotatably to the crankshaft, where the electric machine has a control unit for controlling the electric machine, and the electric machine has a device for determining the angular position of the rotor with respect to the stator. The process according to the invention includes the following steps:

(a) the current angular position of the rotor is detected by the device for determining the angular position, and this information is transmitted to the control unit;

(b) the detected angle values are used in the control unit to determine the corresponding, current crankshaft angle;

(c) the crankshaft angle determined in this way is transmitted from the control unit to the control unit of the engine; and (d) the detected angle values of the rotor and/or the crankshaft angles determined from those values are stored at least temporarily in a memory unit.

As a result of the process according to the invention, the disadvantages associated with the state of the art described above can be avoided. In particular, the process according to the invention can be used to start the engine quickly.

A basic idea of the present invention is that the electric machine connected to the engine is already equipped in most cases with a high-resolution rotational angle detector. These position signals are evaluated by the control unit of the electric machine. Because the rotor of the electric machine is connected nonrotatably to the crankshaft of the engine, it is possible to use these rotor angle values to determine the current crankshaft angle also. A top dead center signal, for example, can be generated by a single signal formed over a crankshaft angle of 360°, so that the previously required, tedious learning process extending over two complete revolutions of the crankshaft can be eliminated. In addition, there is the possibility of omitting the previously conventional and necessary crankshaft angle signal sensors.

As a result, the number of parts required for the engine can be reduced, which leads to cost savings. The angle values of the rotor, furthermore, can be detected very precisely, so that the process also functions reliably even at the very slowest rotational speeds of the engine.

A start-stop function, as already mentioned in the introduction to the specification, is also possible with the process according to the invention.

The electric machine can be designed as a so-called starter-generator, for example. Such a design is explained in greater detail below in connection with the drive train according to the invention. The electric machine can also be designed as an electric drive, such as in a hybrid drive or as an electric machine with some other type of functionality. The only important point is that a part of the electric machine, preferably its rotor, must be connected nonrotatably to the crankshaft of the engine, so that the measured angle values of the rotor can be used to determine the crankshaft angle.

According to the invention, the detected angle values of the rotor and/or the crankshaft angles determined from those values are stored at least temporarily in a memory unit.

From this memory unit, the corresponding values can be called up at any time by the control unit. Storage of the corresponding values in this way offers significant advantages in conjunction with, for example, the above-described start-stop function of the engine. If the signals are stored, for example, when the engine stops, then it is possible to omit the learning phase the next time the machine is started. A first, defined, injection and the starting of the engine can be accomplished in less than one revolution of the crankshaft.

A learning phase is therefore required only when the machine is put into service the first time or after an interruption in the voltage supply to the memory unit. If the engine is used in a motor vehicle, for example, such an interruption in the voltage supply could occur, for example, when the battery of the vehicle is disconnected, such as during the course of a visit to the repair garage.

The engine can advantageously have at least one camshaft. In this case, the current corresponding camshaft angle can also be determined in the control unit on the basis of the detected angle values and transmitted to the control unit of the engine. In a further elaboration, the camshaft position angle can be stored at least temporarily in a memory unit.

It is not absolutely necessary to determine the camshaft position angle, however. The camshaft signal, namely, is necessary only to differentiate between the top dead center at which gas exchange occurs (GTDC) and the top dead center at which ignition occurs (ITDC). These top dead center values are of interest for the control of the gas exchange process. The camshaft is usually driven by the crankshaft. The camshaft has the task of opening and closing the valves required for ejecting the burned gases and for drawing in the fresh gases. Shortly before bottom dead center (BDC), the exhaust valve opens, and the combustion gases leave the combustion chamber. Shortly before the top dead center of a piston connected to the crankshaft (TDC), the intake valve opens while the exhaust valve is still open. To differentiate this from the top dead center for ignition (ITDC), from which the combustion process proceeds, we call this position of the crankshaft the top dead center for gas exchange (GTDC).

When the camshaft angle position is determined on the basis of the angle position values of the rotor of the electric machine, it is possible as also in the case of the crankshaft to omit the previously required separate camshaft sensor. It is possible to proceed here from the insight that a reset-start of the engine is usually a very infrequent occurrence. When the camshaft sensor is omitted, it would be possible to make use of a learning routine to recognize whether the detected top dead center (TDC) in question is a GTDC or a ITDC, although this would entail a certain sacrifice in terms of starting performance, that is, the starting time would not be as short. The type of dead center in question can be determined by testing, for example.

It is therefore also possible for the control unit to determine dead center signals for the crankshaft and/or the camshaft on the basis of the detected angle position values.

It is advantageous to connect the control unit to a voltage source, so that the control unit is supplied with voltage from the voltage source even after the engine is turned off.

This is advantageous with respect to the start-stop process described above.

In this context, it is possible for the voltage supply for the control unit to be turned off after a certain predetermined time. This can be important when the process is used in motor vehicles in conjunction with, for example, the so-called "airport test". In this test, the closed-circuit current in a vehicle is measured over the course of a relatively long period during which the vehicle is out of service. The default value in the "airport test" is 30 days. It is considered that the vehicle has passed the airport test if it can still be started after 30 days of idleness. To ensure this, the electrical loads must be turned off so that the smallest possible amount of closed-circuit current is present. In this case, it may be advisable to turn off the voltage supply to the control unit after a certain amount of time has elapsed. In cases where the voltage has been turned off, it would be necessary to work through a learning phase first, before the engine is to be started the next time. But this does not represent a problem, because the duration of this learning phase, as already explained above, can be significantly reduced by the process according to the invention.

If the control unit is always being supplied with control voltage, the electronic circuitry of the control unit and of the device for determining the angular position of the rotor can remain in operation at all times. Even after the engine has been turned off, any movement of the crankshaft, no matter how slight, will still be detected. When the process is applied in a vehicle, a situation such as this can occur when the vehicle is towed, rolled downhill, worked on in a garage, etc.

It is advantageous for the device for determining the angular position of the rotor to operate on an analog basis. Thus the lower, still allowable limit rpm value can be reduced to virtually zero revolutions per minute. The smallest changes in the rotational angle of the electric machine and thus also the smallest movements of the crankshaft can now be detected. When the process according to the invention is used in a vehicle, a slight movement of the crankshaft can occur, for example, when the vehicle is rolling slowly with the engine off and then, for example, the clutch is engaged for braking.

According to the second aspect of the invention, a control unit for determining the crankshaft angle of an engine is provided, where the engine is connected to an electric machine, functioning in particular as a starter-generator, where the rotor of the electric machine is connected nonrotatably to the crankshaft, and where the control unit is or can be connected to a device for determining the angular position of the rotor of the electric machine with respect to the stator. The control unit also has a processor unit for processing the values generated by the device for determining the angular position. According to the invention, the processor unit has program means for implementing the process according to the invention described above.

The program means can, for example, be in the form of computer programs, i.e., software, by means of which the detection of the angular position of the rotor of the electric machine and the resulting determination of the crankshaft angle are controlled. As a result, the determination of the crankshaft angle according to the invention is carried out in a simple manner, the special advantages of which have already been described above in detail.

The control unit is preferably equipped with a memory unit for storing at least temporarily the detected angle values of the rotor and/or the crankshaft angles and/or camshaft angles determined from the angle values of the rotor.

According to another aspect of the invention, a memory unit for programs is made available, which holds program means for implementing the process according to the invention. A conventional storage medium can be provided to serve as the memory unit, for example, but the program means, i.e., the software, in the memory unit means that it embodies a special functionality, which makes it differ from the known storage media in the particular modality of the present invention.

According to another aspect of the invention, a computer program product for implementing the process according to the invention described above is also provided.

According to another aspect of the invention, a drive train is created, which includes an engine and an electric machine connected to the engine, which electric machine has a rotor connected nonrotatably to the crankshaft of the engine, a stator, a control unit for controlling the electric machine, and a device for determining the angular position of the rotor. The drive train according to the invention includes means for implementing the process according to the invention as described above.

In the drive train, therefore, it is possible in an especially simple and yet reliable manner to determine the crankshaft angle even at the very lowest of crankshaft rpm's. The number of parts which are required can also be reduced, because there is no longer any need for separate sensor elements for determining the crankshaft angle and/or the camshaft angle. This leads ultimately to a reduction in cost.

The drive train can advantageously have a control unit according to the invention as described above. In addition, the drive train can also comprise program means as described briefly above.

The device for determining the angular position of the rotor can be designed in many different ways.

For example, the device for determining the angular position of the rotor can be designed as an analog sensor element.

It is especially advantageous for the device for determining the angular position of the rotor to be designed as a so-called "resolver". Resolvers are usually inductive signal transmitter systems. They can, for example, also be described as synchros with a two-stranded stator winding, and they are generally to be classed among the transformer transmitters. A resolver, for example, has one rotor winding and two stator windings 90° apart. The voltages induced in the stator windings are a function of the rotational angle of the rotor. The resolver transmits the corresponding angular position as soon as the power is turned on.

An especially advantageous embodiment of a device for determining the angular position is described in, for example, EP 0 554 900, the disclosure of which is included to this extent in the specification of the present invention. In this document, an electric motor with an inductive position detector for determining the relative position of the rotor of the electric motor with respect to its stator is described.

The electric machine is preferably designed as a synchronous machine, especially as a permanent-magnet synchronous machine. In principle, however, the invention is not limited to specific types of electric machines. Instead, any possible electric machine can be used. To be mentioned here are electric machines of the internal or external rotor type, synchronous machines, asynchronous machines, permanent-magnet machines, etc.

It is advantageous for the electric machine to be a starter-generator. This is an electric machine with a rotor which is attached by suitable support means to the crankshaft of an engine such as an internal combustion engine. The starter-generator is used not only to start and to stop the engine but also to perform various other functions such as braking functions, booster functions, battery management, active vibration damping, synchronization of the engine, etc. A starter-generator of this type can be designed advantageously as a synchronous machine with either an external rotor or an internal rotor and can be connected by way of a stator mount, for example, as a support element to the engine, such as the engine block of an internal combustion engine.

When the electric machine is designed as a starter-generator and the engine is designed as an internal combustion engine, it is advantageous for the electric machine to be connected to the crankshaft of the engine. For this purpose, there are various conceivable alternatives. First, the electric machine can be mounted on the transmission side, that is, between the clutch housing and the flywheel. It is also possible for the electric machine to be installed on the side opposite the power takeoff side, that is, between the crankshaft housing and the belt drive. The electric machine is preferably mounted on the flywheel, especially when the electric machine is designed with an external rotor.

A process according to the invention as described above and/or a control unit according to the invention as described above and/or a computer program product as described above and/or a drive train according to the invention as described above can be used to particular advantage in or for a motor vehicle.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
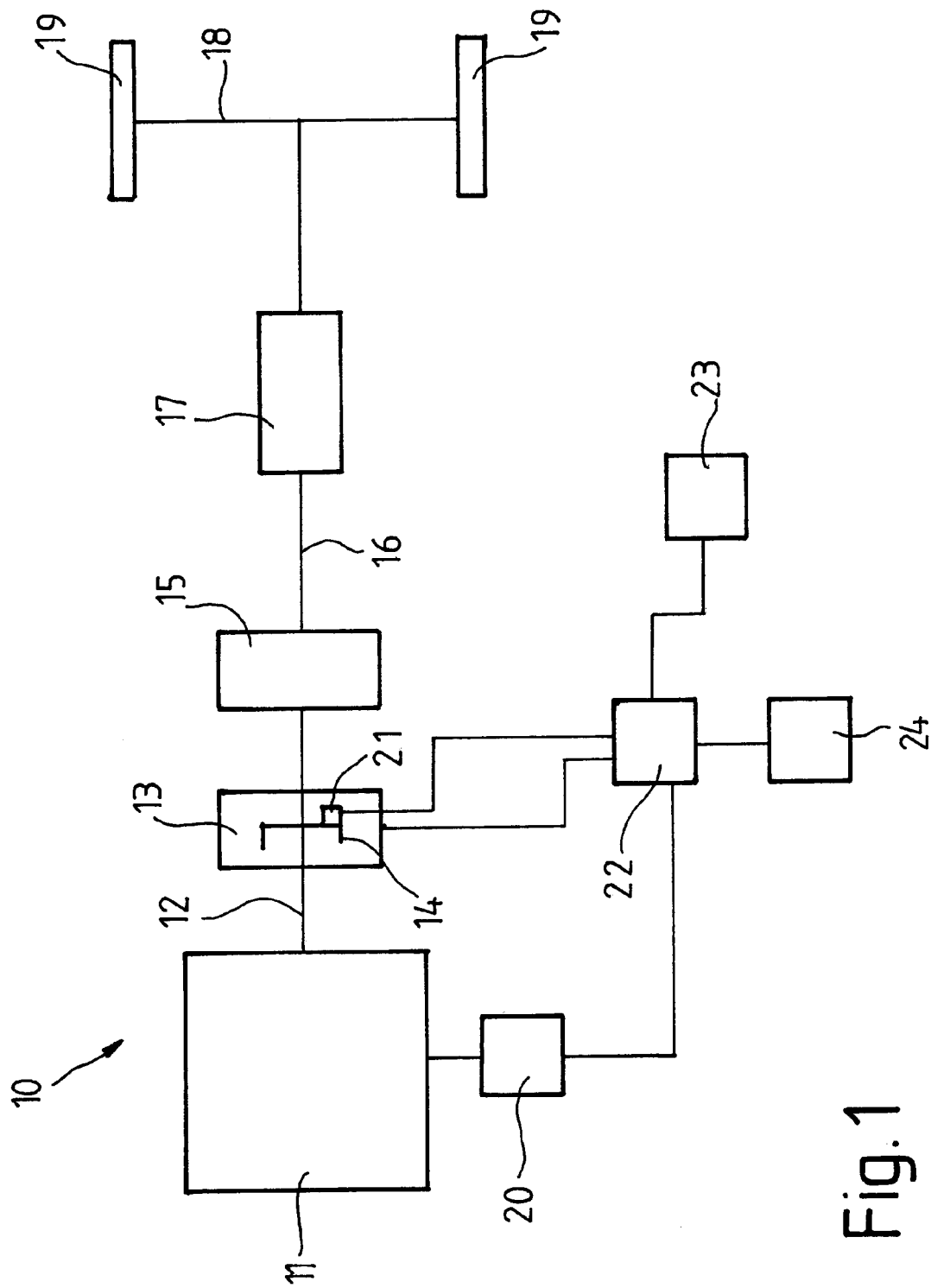
FIG. 1 is a schematic diagram of a drive train in a vehicle for implementing the process according to the invention.

FIG. 1 shows the drive train 10 of a vehicle. The drive train 10 has an engine 11 designed as an internal combustion engine. The internal combustion engine 11 is connected on the power takeoff side by way of a crankshaft 12 to an electric machine 13 designed as a starter-generator. The crankshaft 12 in this case is connected nonrotatably to the rotor 14 of the electric machine.

The electric machine 13 is connected in turn on the power takeoff side to a device for transmitting the torque, here a clutch 15. The clutch 15 is connected on the power takeoff side to a power takeoff shaft 16 of a drive unit 17. The drive unit 17 in the present case is an automatic transmission, and the power takeoff shaft 16 is a transmission input shaft. The torque generated in the drive train 10 is transmitted to an axle 18 and from there to the wheels 19 of the vehicle.

So that the electric machine 13 can be controlled, a control unit 22 is provided. The engine 11 is controlled by its own, separate control unit 20.

Many different types of data pertaining to the electric machine 13 are entered into and processed by the control unit 22 for the electric machine 13. Among others, data for determining the current angular position of the rotor 14 are entered into and processed by the control unit 22. For this purpose, the control unit 22 is connected to a device 21 for detecting the rotational angle of the rotor 14. This device 21, which can be designed as a resolver, for example, is built into the electric machine 13. By way of the device 21, the current rotational angle of the rotor 14 is detected and transmitted to the control unit 22.

A memory unit 24, in which many different types of values, data, and information can be stored, at least temporarily, is connected to the control unit 22. The control unit 22 is also connected to the control unit 20 of the engine 11, so that information can be exchanged.

The control unit 22, finally, is also connected to a voltage source 23, so that the control unit 22 is supplied with voltage from the voltage source 23 even after the engine 11 has been turned off.

So that the crankshaft angle can be determined simply, quickly, and reliably and above all so that it can be determined even at the lowest crankshaft rpm's, it is provided in accordance with the invention that, first, the current angular position of the rotor 14 is detected by the device 21 for determining the angular position and then sent on to the control unit 22 of the electric machine 13. Then, on the basis of these detected angle values, the corresponding current crankshaft angle is determined in the control unit 22. This is possible, because the crankshaft 12 is connected nonrotatably to the rotor 14. The determination of the crankshaft angle can be accomplished by the use of suitable program means. The crankshaft angle determined in this way is transmitted from the control unit 22 to the control unit 20 of the engine 11. The detected angle values of the rotor 14 and/or the crankshaft angles determined from them are stored at least temporarily in the memory unit 24.

Because the control unit 22 is always supplied with control voltage from the voltage source 23, the electronic circuitry of the control unit 22 and of the device 21 for determining the angular position of the rotor 14 can remain in operation at all times. Even after the engine 11 has been turned off, any movement of the crankshaft 12, no matter how slight, will be detected.

As a result of present invention, it is possible in a simple and yet reliable manner to determine the crankshaft angle and/or the camshaft angle of an engine even at the lowest rpm's. Little or no effort is required to implement the process, which means that costs can also be reduced.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for controlling an engine connected to an electric machine having a stator and a rotor, said engine having a camshaft and a crankshaft which is nonrotatably connected to the rotor, said method comprising:

detecting the current angular position of the rotor with respect to the stator, transmitting the current angular position of the rotor to a control unit of the electric machine, determining a top dead center signal of the crankshaft in the control unit of the electric machine based on the angular position of the rotor, wherein said top dead center signal is one of a top dead center for ignition and a top dead center for gas exchange, determining the corresponding camshaft angle in the control unit of the electric machine using the detected current angular position of the rotor and the top dead center signal, transmitting the camshaft angle to a control unit for the engine, and storing the detected current angular position of the rotor and the corresponding camshaft angle at least temporarily in a memory unit.

2. A method as in claim 1, further comprising supplying said control unit of said electric machine with voltage from a voltage source, detecting the current angular position of the rotor, and storing the current angular position of the rotor and the camshaft angle even when the engine is turned off.

3. A method as in claim 1 wherein the current angular position of the rotor with respect to the stator is detected by a device which operates on an analog basis.

4. A memory unit for computer programs, said memory unit comprising a program for carrying out the method of claim 1.

5. A computer program product for carrying out the method of claim 1.

6. A method as in claim 1 wherein, when said engine is stopped, the detected current angular position of the rotor and the camshaft angle are stored until the next time the engine is started, whereby said engine can be started in less than one revolution of the crankshaft.

7. A method as in claim 1 wherein the top dead center signal is determined using a learning routine.

8. A control unit for determining the camshaft angle of an engine connected to an electric machine having a camshaft and a stator and a rotor, said engine having a crankshaft which is nonrotatably connected to the rotor, said control unit comprising:

means for connecting to a device for detecting the current angular position of the rotor with respect to the stator, means for determining a top dead center signal of the crankshaft based on the angular position of the rotor, wherein said top dead center signal is one of a top dead center for ignition and a top dead center for gas exchange, means for determining the corresponding current camshaft angle using the detected current angular position of the rotor and the top dead center signal, means for transmitting the camshaft angle to a control unit for the engine, and means for transmitting the detected current angular position of the rotor and the corresponding camshaft value to a memory unit for storage at least temporarily.

9. A drive train comprising:

an engine having a crankshaft and a camshaft, a control unit of the engine, an electric machine having a stator and a rotor, said rotor being nonrotatably connected to the crankshaft, means for detecting the current angular position of the rotor with respect to the stator, a control unit of the electric machine for determining the corresponding current camshaft angle using the detected current angular position of the rotor, means for transmitting the camshaft angle to the control unit of the engine, and a memory unit for storing the detected current angular position of the rotor and the corresponding camshaft value at least temporarily.

10. A drive train as in claim 9, wherein said means for detecting the current angular position of the rotor with respect to the stator comprises a device which operates on an analog basis.

11. A drive train as in claim 9, wherein said electric machine is a permanent magnet synchronous machine.

12. A drive train as in claim 9, wherein said electric machine is a starter-generator.

* * * * *